June 17, 1958 H. J. SIERADZKI 2,839,267
IRIS VALVE CONSTRUCTION
Filed Oct. 19, 1955
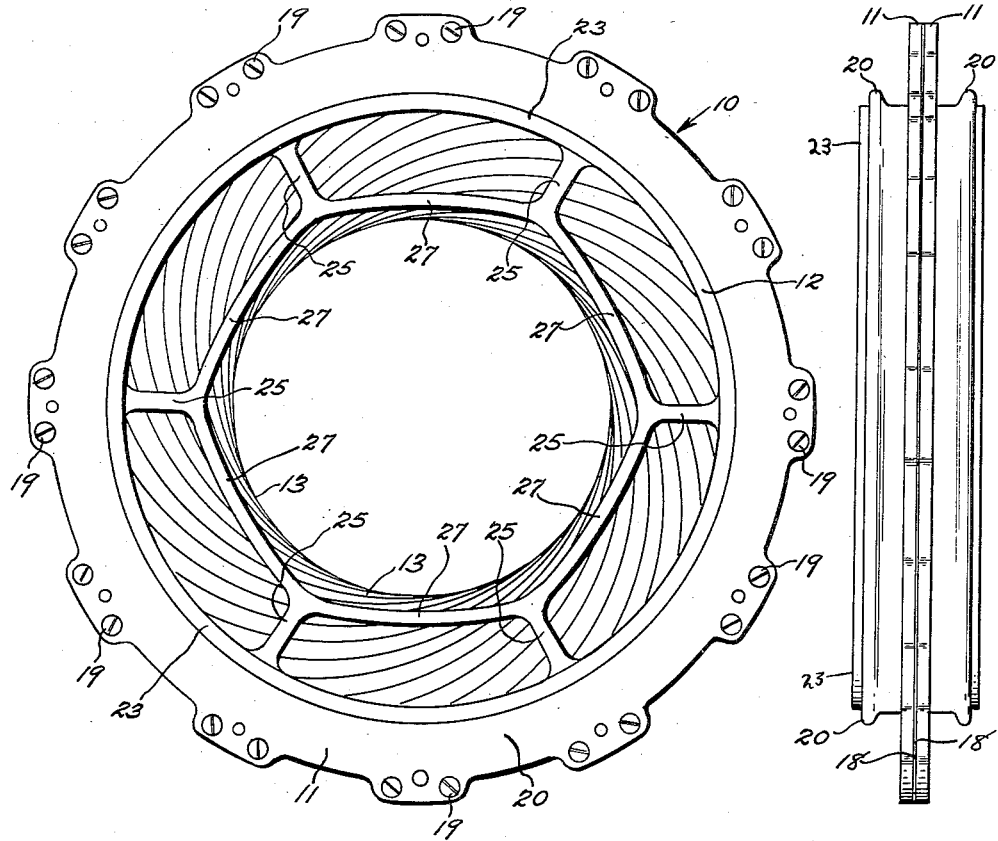
Fig.1 Fig.4
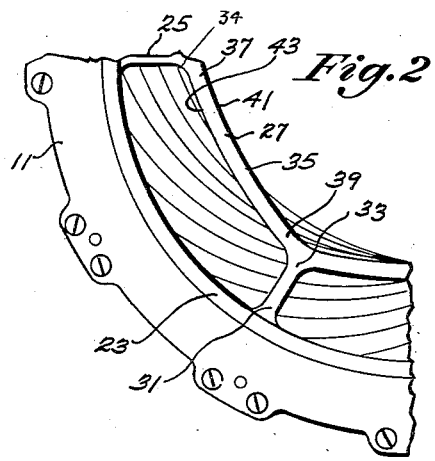 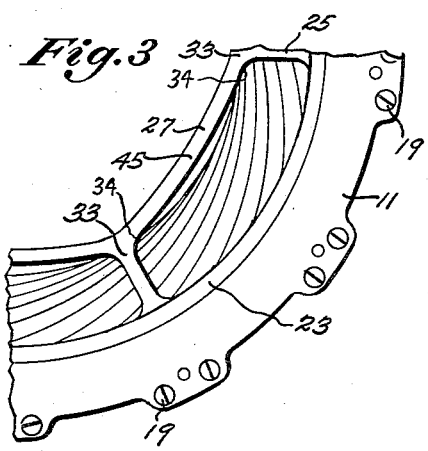
Fig.2 Fig.3

United States Patent Office 2,839,267
Patented June 17, 1958

2,839,267

IRIS VALVE CONSTRUCTION

Henry J. Sieradzki, Garden City, N. Y., assignor to Lundy Manufacturing Corporation, Long Island City, N. Y., a corporation of New York Application October 19, 1955, Serial No. 541,408

5 Claims. (Cl. 251—212)

This invention relates generally to the field of iris-type valves or closures of a type generally employed in air-conditioning systems for aircraft, railroad cars, and a variety of ventilating systems.

Such devices are known in the art, and have been used in increasing numbers in a variety of sizes and applications. As the effective diameter of the valve increases, it has been found that it is necessary to support the partially or fully closed movable blades, at least on the side opposite that against which the flow of air is directed, in order that the same be prevented from collapsing under relatively high pressure, and to prevent distortion of the blades from the normal operating plane so that the valve may be capable of opening or closing smoothly and quickly. This support is usually provided by a framework known in the art as a spider which extends across the area controlled by the blades in such a manner as to contact them in the event distortion occurs so as to maintain them within the operating plane.

It is preferable that the spider be of such configuration that it does not extend to the central portion of the area, in order that there be a minimum of obstruction of the flow of air when the valve is in a partially closed position. Where the spider employs members which are disposed concentrically with respect to the circularly-shaped controlled area, and the valves are of a relatively large diameter, and subjected to an air pressure while closing, there has been a tendency for the blades to "hang up" as they reach the concentrically disposed supporting members due to the deflection of the aperture edge of the closing iris. When such a condition occurs, it is impossible to close the vanes past the concentric portions, and the accompanying discomfort must be endured by the passengers of the aircraft or other vehicle.

It is therefore among the principal objects of the present invention to provide an improved iris-type control valve having spider means of such a configuration so that bellowing of the vanes is prevented without danger of interference with the closing aperture during operation, and which may be easily closed or opened irrespective of the pressure differential existing on either side of the valve.

Another object of the invention lies in the provision of an improved iris-type control valve of the class described, in which sliding friction between the component blade and supporting portions of the spider has been reduced to a minimum.

These objects, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1 is a vertical view in elevation of an iris-type valve embodying the invention.

Figure 2 is a fragmentary view in elevation, corresponding to that seen on Figure 1, but showing the movable blade members thereof in an altered relative position.

Figure 3 is a similar fragmentary view in elevation showing the blade members thereof in another altered relative position.

Figure 4 is a side elevational view as seen from the right hand portion of Figure 1.

In accordance with the invention, the device, generally indicated by reference character 10, comprises broadly: a pair of oppositely disposed support plates 11, one of which is movable with respect to the other in a well-known manner to result in the opening or closing of the valve, a pair of supporting spiders 12, and a plurality of diaphragm blades 13. Means (not shown) is provided for moving the blades between opened and closed positions, as is well-known in the art.

The support plates 11 may be of any well-known type, including opposed inner surfaces 18 and provided with screw means 19, or other suitable means for maintaining the outer flange members 20 in substantially parallel condition.

The supporting spider 12 is preferably integrally cast from suitable material, and includes an outer ring member 23, a plurality of first substantially radially disposed support members 25, and a plurality of second support members 27.

The first or radially disposed support members 25 are generally similar, each including an outer end 31, and an inner end 33. As may be seen on Figure 1, the length of the members 25 is approximately one-third that of the radius of the area controlled by the blades 13.

The second support members 27 are generally curvilinear in configuration, each including an arcuately-shaped main body 35, and end portions 37 and 39 which are merged with the inner ends 33 of the support members 25. As may be seen on Figure 1, the inner edge 41 and outer edge 43 of each of the support members 27 are arcuate with respect to a common center of curvature for each support member, but the radius of curvature for each support member commences from a point other than the center of the area controlled by the blades 12. In the embodiment shown on the drawing, the center of curvature for each port member 27 may be on a common circle (not shown). Referring to Figures 2 and 3, there may be seen progressive stages in the opening or closing of the blades 13 whereby the objectionable jamming action between the exposed edges of the blades and the spider is avoided.

As the blades move to a closing position, they are supported by the first or radially disposed support members 25, until they reach the inner ends 33. The edges are then guided by the fillets 34, and the outer edge 43 so that the same is contacted progressively with a diminishing length of unsupport in a direction running from the fillets 34 to the central portion 45 thereof. In this way, instantaneous contact with progressively diminishing length of unsupported vane edge along the entire outer edge 43 is provided so that there is no tendency for the edges of the blade to become locked thereagainst owing to slight distortion caused by pressure differentials existing during operation.

Referring to Figure 2, there may be seen the condition of the blades after all of the outer edge 43 has been passed, and a portion of the blades project past the inner edge 41 thereof. In this condition, there is no danger of "hang up," since there is no edge presented against which the edges of the blades may make contact.

The objectionable jamming action is completely eliminated by the formation of secondary support members in such a manner as to have a radius of curvature other than that of the edges of the blades at the instant the same are contacted. Thus, the edges of the blades are lead past the edge of the support member since only point contact is possible at any one given position. The curvature of the secondary support members may be of any desired value, as long as it is not identical with that of the blades at the point the supporting surface thereof begins to be passed.

It may thus be seen that I have invented novel and highly useful improvements in iris-valve construction, in which improved spider means which is employed to prevent collapse or distortion of the component blade members is so constructed as to avoid all possibility of the blades becoming jammed upon the spider during opening or closing. The spider may be fabricated using existing techniques known in the art, and no disadvantages, such as weight limitations, are involved in incorporating the inventive structure into existing valve constructions. The improved spider construction in no way hinders the operation of the blades throughout the entire path of travel, while yet effectively providing adequate support to the blades in all positions thereof.

I wish it to be understood that I do not consider the invention limited to the exact details of structure shown and set forth in this specification, for obvious modifications will occur to those skilled in the art to which the present invention pertains.

I claim:

1. In a circular iris-type valve closure including a plurality of movable blades, means for actuating said blades to an opened and a closed position to control a circular area, and supporting means lying substantially in a plane parallel to that of said blades and partially overlying the area for preventing the distortion and collapse of said blades under the existence of a substantial pressure differential on either side of said blades when in a closed position, the improvement comprising: said supporting means including a plurality of supporting members of elongated configuration and interconnected at the end portions thereof to define a centrally disposed portion of said controlled area which is free of obstruction, said supporting members each having a radius of curvature, the center of each radius of curvature lying at a point other than the center of said controlled area.

2. In a circular iris-type valve closure including a plurality of movable blades, means for actuating said blades to an open and a closed position to control a circular area, and supporting means lying substantially in a plane parallel to that of said blades and partially overlying the area for preventing the distortion and collapse of said blades under the existence of a substantial pressure differential on either side of said blades when in a closed position, the improvement comprising: said supporting means including a supporting spider lying within said controlled area, said supporting spider including a plurality of elongated supporting members each having a radius of curvature, the center of each of which lies at a point other than the center of said circular area, said supporting members being interconnected at the end portions thereof to define a centrally disposed portion of said controlled area which is free of obstruction.

3. In a circular iris-type valve closure including a plurality of movable blades, and means for actuating said blades to an open and a closed position to control a substantially circular area, and supporting spider means lying substantially in a plane parallel to said blades and overlying said area for preventing the distortion of said blades under the existence of a substantial pressure differential on either side of said blades when in a closed position, the improvement comprising: a first plurality of supporting members comprising said spider means which are substantially radially arranged with respect to said area and extending only partially toward the center of said area, and a second plurality of generally elongated supporting members associated at the ends thereof with the inner ends of said first plurality of supporting members; said second plurality of supporting members defining a centrally disposed portion of said controlled area which is free of obstruction.

4. In a circular iris-type valve closure, including a plurality of movable blades, means for actuating said blades to an open and closed position to control a circular area and supporting spider means lying substantially in a plane parallel to said blades and overlying said area for preventing distortion of said blades under the existence of a substantial pressure differential on either side of said blades when in a closed position, the improvement comprising: said spider means including a first plurality of supporting members which are substantially radially arranged with respect to said area, and extending only partially toward the center of said area, a second plurality of supporting members of generally elongated configuration and associated with said first plurality at the inner ends thereof, said second plurality of supporting members each having a radius of curvature which extends to a point other than the center of said area, said second plurality of supporting members defining a centrally disposed portion of said controlled area which is free of obstruction.

5. In a circular iris-type valve closure including a plurality of movable blades, means for actuating said blades to an open and a closed position to control a circular area and supporting spider means lying substantially in a plane parallel to said blades and overlying said area for preventing distortion of said blades under the existence of a substantial pressure differential on either side of said blades when in a closed position, the improvement comprising: said spider means including a first plurality of supporting members which are substantially radially arranged with respect to said area, and extending only partially toward the center of said area, a second plurality of supporting members associated with said first plurality at the inner ends thereof, said second plurality of supporting members each having a radius of curvature which extends to a point other than the center of said area, all of said last mentioned points lying on a common circle, the center of said common circle being disposed substantially at the center of said controlled area whereby said second plurality of supporting members may define a centrally disposed portion of said controlled area which is free of obstruction.

References Cited in the file of this patent

UNITED STATES PATENTS 2,649,272     Barbato _____ Aug. 18, 1953